United States Patent
Zajdel

[11] 3,761,103
[45] Sept. 25, 1973

[54] TOOL HOLDERS

[76] Inventor: Casimir M. Zajdel, 1527 N. Lockwood Ave., Chicago, Ill. 60651

[22] Filed: Dec. 1, 1971

[21] Appl. No.: 203,750

[52] U.S. Cl. ................................. 279/1 J, 279/18
[51] Int. Cl. .............................................. B23b 31/08
[58] Field of Search .................. 279/16, 17, 18, 1 J

[56] References Cited
UNITED STATES PATENTS

| 2,813,723 | 11/1957 | Marcellus | 279/18 |
| 2,525,646 | 10/1950 | Burg | 279/16 |
| 2,780,468 | 2/1957 | Dunbar | 279/16 |
| 3,443,818 | 5/1969 | Fauth | 279/16 |
| 2,574,016 | 11/1951 | Burg | 279/16 X |
| 3,454,283 | 7/1969 | Benjamin et al. | 279/16 |

*Primary Examiner*—Andrew R. Juhasz
*Assistant Examiner*—James F. Coan
*Attorney*—S. J. Lehrer

[57] ABSTRACT

A tool holder movable toward work cut or reamed by the tool. The holder has a frontal head containing a tool carrier; and the latter is floatingly disposed in a marginal spring contained in the head. A coupling keeps the tool carrier from turning relative to the head, but allows the tool carrier to deviate laterally in the floating leeway in the event of irregularities or off-center conditions in the work. An intermediate ring between the tool carrier and the outer head portion has a feature to lock the tool carrier endwise in the head.

10 Claims, 6 Drawing Figures

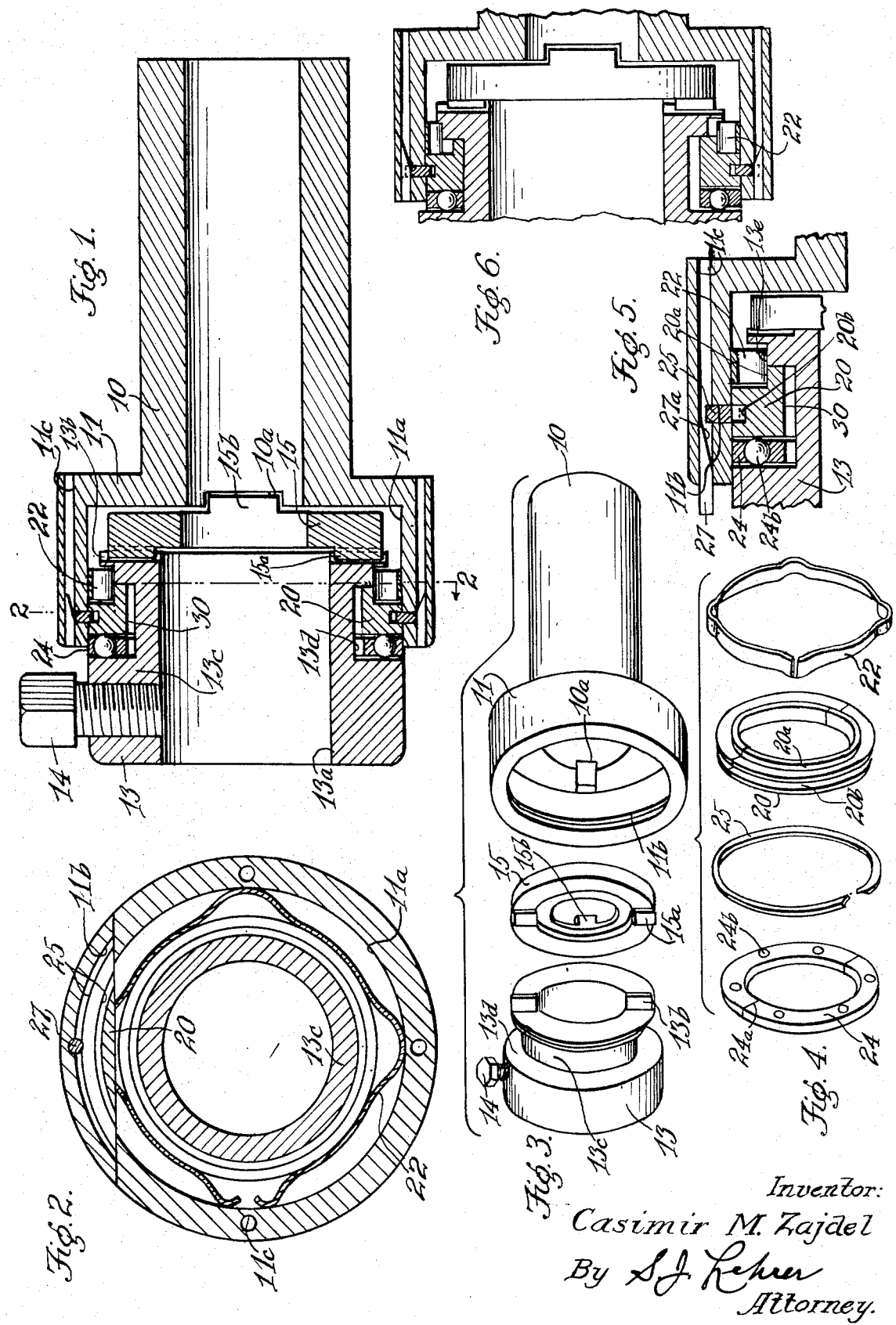

TOOL HOLDERS

My invention relates to holders for tools, such as drills, reamers and other tools used for cutting metals. Holders in this category have a feed to direct the tool into cutting engagement with the work. At times the latter is out of line or rotates irregularly; and it is one object of the present tool holder to render the tool yieldable and prevent off-center or irregular cutting of the work.

A further object is to design a holder of the above character with a floating support for the tool which is yieldable laterally when the work is in off-center or irregular position or rotation.

Another object is to construct the novel holder in compact form and with internal parts which are simple and easy to assemble and take apart.

A better understanding of the invention may be gained by reference to the accompanying drawing, in which FIG. 1 is a longitudinal section of the tool holder;

FIG. 2 is a section on the line 2—2 of FIG. 1;

FIG. 3 is a group perspective view of the basic parts of the holder;

FIG. 4 is a similar view of intermediate parts;

FIG. 5 is an enlargement of the upper left-hand portion of FIG. 1 showing the initial position of a locking device; and FIG. 6 is a view of the left-hand portion of FIG. 1 illustrating the yielding feature of the holder.

Referring specifically to the drawing, 10 denotes the shank of the holder and 11 the frontal head thereof. The latter is chambered from the front, as indicated at 11a, in order to accommodate a tool carrier 13. The latter is tubular, as indicated at 13a, in order to receive the shank of the drill or other tool (not shown) supported by the holder; and a clamping screw 14 is directed through the side of the tool carrier in order to secure the tool to the same.

Whether the tool is to be held in a rotatable or non-rotatable holder, it must be secured non-rotatably in the same; and means to do this are provided between the tool carrier and the holder shank 10. Thus, the rear face of the tool carrier has a pair of diametrically-spaced slots 13b shown in vertical alinement, as more clearly seen in the left-hand part of FIG. 3. FIG. 1 indicates that the front end of the shank 10 has a pair of similar slots 10a in horizontal alinement. A coupling ring 15 is interposed between the tool carrier and the front end of the holder shank 10. The frontal face of the coupling ring has lugs 15a registering with the tool carrier slots 13b, while the rear face has lugs 15b registering with the shank slots 10a. Thus, when tool carrier, coupling ring and holder shank are assembled as shown in FIG. 1, the tool carrier becomes non-rotatably connected with the shank. However, the radially-directed carrier slots 13b and shank slots 10a permit the tool carrier to shift laterally while the tool carrier remains connected as stated.

It is noted in FIG. 1 and in the left-hand portion of FIG. 3 that the tool carrier 13 is reduced between its ends with a neck portion 13c defining an annular cavity 13d. The latter serves primarily to accommodate a centering support for the tool carrier in the frontal portion of the tool holder head 11. FIGS. 1 and 4 show the support in the form of a massive ring 20 spacedly surrounding the neck portion 13c, such ring being split in halves— as shown in FIG. 4 — for mounting in the neck cavity 13d of the tool carrier 13. An intermediate part in the form of an open-end leaf spring 22 surrounds the facing ends of the tool carrier and ring 20. For this purpose such ends are cut with shoulders 13e and 20a to seat the leaf spring 22 as shown in FIG. 2. It will also be noted in the top center of FIGS. 1 and 5 that an annular recess is formed between a flange on the inner end of cavity 13d of the tool holder and the shoulder 20a of the ring 20, and that these parts have a fixed relation. This recess provides a support for the leaf spring 22 which keeps it in place to bear with a centering influence on the tool carrier 13 despite radial or off-center deviations imposed on the same. A second part is also mounted in the cavity 13d, and comprises a ring 24 which is diametrically split at 24a and clearly shown at the left-hand end of FIG. 4. This ring is ball-bearing as seen at 24b, and interposed between the ring 20 and the head of the tool carrier as shown in FIG. 1.

When the tool holder is to be assembled, the coupling ring 15 is first inserted into the tool holder head 11; and the tool carrier 13 is next inserted to make the interlocking fit previously described. However, previous to this action the tool carrier is itself assembled with the leaf spring 22, the ring 20 and the ball-bearing ring 24 as a unit, the spring and rings making a snug fit in the front of the holder head to the extent shown in FIG. 1.

The assembly of the tool carrier is locked against endwise movement in the holder head. For this purpose the latter is made with a deep annular groove 11b on the inside, as seen in FIG. 5. A self-expanding open-end spring 25 — also seen in FIGS. 2 and 4 — seats in the groove 11b in the manner shown in FIG. 5. The holder head has a circularly-spaced series of horizontal bores 11c near its periphery, as shown at the left in FIG. 2 and upper right in FIG. 5. The groove 11b extends only half-way into the bores 11c, and normally seats the spring 25 to that extent. The outer edge of the spring is rounded on both sides; and the spring is slidable in the groove 11b when constricted. In the normal or expanded position of the spring its inner edge is flush with the inner surface of the holder head opening, and therefore permits the work carrier assembly to be inserted into the holder to the position shown in FIG. 5. Now a set of end pegs 27, with beveled ends 27a directed to the rounded outer edge of the spring 25, may be driven from the position of FIG. 5 to a point flush with the front end of the holder head, as shown in FIG. 1. This action will constrict the spring 25 to project into a peripheral groove 20b of the ring 20 as clearly shown in FIG. 5, locking the tool carrier assembly in working engagement with the holder head 11.

It will now be apparent that the tool holder is in a position to receive and direct a tool against work in front of it. However, FIG. 1 shows that the work carrier is centered in the leaf spring 22, and that a uniform annular space 30 occurs between the tool carrier and the inside of the ring 20. The tool carrier is thus floatingly disposed in the holder head, and therefore has lateral leeway when the work is off-center or rotates with irregular motion. In such event the present tool holder absorbs the irregularity, and the cutting operation continues without binding or distortion. FIG. 1 shows the tool carrier on center and with exaggerated marginal leeway; and FIG. 6 shows the extreme leeway directed upwardly. However, in actual practice the leeway necessary to allow for is only a few thousandths of an inch, indicating that the floating feature of the tool holder need only have a slight tolerance for ordinary variations in work position or rotation. Further, in case it is advisable to take the tool holder apart for inspection or repair, it is only necessary to insert a long pin through the rear end of each bore 11c in order to back each peg 27 out of the holder head. The retraction of the long pin from each bore will then leave the way clear for the locking spring 25 to re-expand into the holder head 11 clear of the ring 20. The tool carrier assembly may now be drawn out of the holder head.

It will now be apparent that the tool carrier of the present tool holder is not only floatingly mounted, but that its lateral yielding factor is eased by the interposition of the ball-bearing ring 24. Also, while the coupling ring 15 positively locks the tool carrier against rotation relative to the holder head, the slide joints 13d–15a between the tool carrier and the coupling ring allow for lateral deviations of the tool carrier. It is thus seen that the parts of the present tool holder are all essential and cooperate to make the tool holder efficient and compact; and the tool holder has no external elements to get loose or invite tampering.

I claim:

1. A tool holder movable toward work engageable by the tool comprising a shank with a chambered frontal head, a tool carrier contained in the head and non-rotatably connected thereto and means disposing the tool carrier floatingly in said head for absorbing irregularities in the work comprising first annular means positionable within said chamber of said head to drivingly interconnect said carrier and said shank in non-rotating engagement and adapted to permit radial displacement of said carrier, second annular means positionable within said chamber to engage with, and lock said carrier within said chamber against axial displacement of said carrier and adapted to permit said radial displacement and resilient annular means positionable within said chamber in contact therewith and with said carrier and said second annular means to yieldably retain said tool carrier on its axis while permitting said radial displacement.

2. The tool holder according to claim 1 wherein said first annular means comprises a coupling between the tool carrier and the shank, the coupling having face projections interlocking with matching cavities in the tool carrier and shank to provide said interconnecting.

3. The tool holder according to claim 1 wherein said first annular means comprises a coupling between the tool carrier and the shank, the coupling having face projections interlocking with matching cavities in the tool carrier and shank to connect the tool carrier and shank, the projections and cavities between the tool carrier and the coupling being radially positioned to allow said radial displacement for the tool carrier.

4. The tool carrier according to claim 1 wherein said second annular means comprises a ring secured endwise in the tool carrier and fitted snugly into said head and biasing means locking the ring endwise into said head and said carrier.

5. The tool carrier according to claim 4, wherein said ring contains an annular groove and further wherein said biasing means comprises a self-expanding marginal spring slidable in said head and registering with the said groove, and slidable means to constrict the spring and project it into the groove to lock said carrier against said axial displacement.

6. The tool carrier according to claim 1 wherein said resilient annular means comprises a flat annular spring engaging with its inner surface a portion of periphery of the inner end of said carrier and a shoulder in said second annular means and engaging with its outer surface the inner wall of said chamber.

7. The tool carrier according to claim 1 wherein said second annular means comprises a ring secured against endwise motion within the tool carrier and fitting snugly in said head, the ring having an annular groove, a self-expanding marginal spring slidable in said head and registering with the groove, said head having a series of circularly-spaced and longitudinally-directed bores in its peripheral portion into which the spring projects, said means further including a series of camming pegs drivable into said bores to crowd the spring in the constricting direction to project into the groove and lock the tool carrier to said head.

8. The tool carrier according to claim 7, said head having an annular cavity disposing the spring and intersecting said bores to a partial extent.

9. The tool carrier according to claim 5, and the tool carrier having an intermediate portion within the ring and spaced inwardly therefrom to permit lateral deviations of the tool carrier in its floating disposal.

10. The tool carrier according to claim 5, the tool carrier having an intermediate portion within the ring and spaced inwardly therefrom to permit lateral deviation of the tool carrier in its floating disposal, and an end-thrust bearing in said portion between the tool carrier and the ring to ease said deviation.

* * * * *